April 14, 1931.　　　R. J. NORTON　　　1,800,900

BRAKE ROTOR

Filed Nov. 23, 1928

Inventor

RAYMOND J. NORTON

By M. W. McConkey

Attorney

Patented Apr. 14, 1931

1,800,900

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE ROTOR

Application filed November 23, 1928. Serial No. 321,452.

This invention relates to brake rotors and more particularly to brake drums on automotive vehicles.

Certain characteristics are requisite for automotive brake drums. These brake members should be of sufficient strength and rigidity to withstand the abrasive forces of frictional braking and the distortive effects of the expansion or contraction of juxtaposed elements. As used on automobiles with an internal expanding brake mechanism, the brake drum structure includes, as an almost essential adjunct, a backing plate or dust plate which serves to close off the open face of the drum to protect the interior brake mechanism from dirt, mud and water. Since this structure comprises two metallic members, one of which is subjected to relatively wide ranges of temperatures, it has been found necessary to allow relatively large initial clearances between those portions of the drum and backing plate which form the closure. As a result, during early runs and before the brake drum has been heated up, the gap presented between the two members may permit the access of water, dust, etc.

It is an object of the present invention to so construct the brake drum that the initial clearance hereinbefore referred to, may be cut down to a practical minimum and at the same time to impart to the brake drum other desirable properties.

The invention is herein shown and described with particular reference to a drum having a radially extending marginal lip at its open face, although it will be understood that the principles of the invention are applicable to other specific types of drums.

Broadly considered, the invention comprehends the idea of forming that portion of the drum which is juxtaposed to the backing plate of a material having a lower coefficient of expansion (and preferably of a higher tensile strength) than the remainder of the ferruginous drum. The preferred embodiment of the invention also comprises first pressing or stamping out a drum from a suitable blank of deep draw steel and then treating the portion referred to in such a manner as will impart to it greater tensile strength and lower heat expansibility. One method of doing this is to form a marginal lip of a ferro-nickel having approximately 36.5% of nickel. To enable a ready comprehension of the invention, I have shown preferred embodiments of it in the accompanying drawings. In these the same reference numerals refer to similar parts throughout the several view of which:

Figure 1:
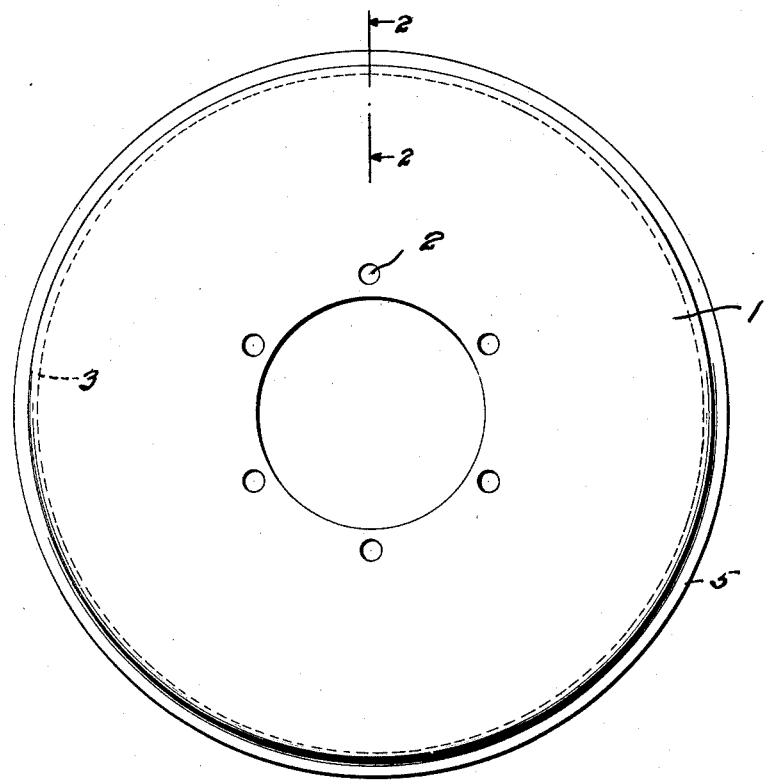
Fig. 1 is an elevation of the drum.
Figure 2:
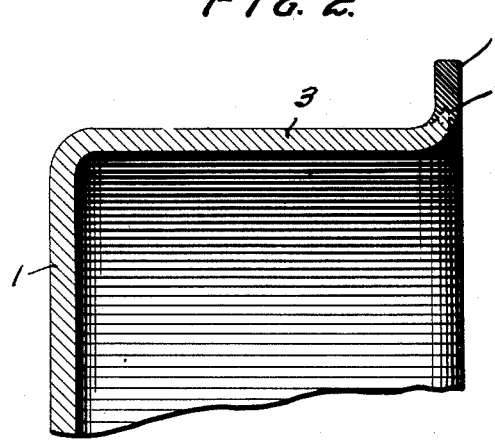
Fig. 2 is a section taken on line 2—2 of Fig. 1.

As indicated hereinbefore, the invention is applicable to any type of drum which is typified in the drawing, as of the conventional type used in automative construction. This comprises a head or securing flange 1, provided with the apertures 2 through which may pass the securing means which attach the drum to the wheels. Integral with the head is a cylindrical braking flange 3. This drum may be made up by stamping out from a suitable blank of metal.

One method of carrying out this, comprises casting an annulus of metal, having the desired properties, upon the edge of the braking flange so as to form an integral joint. To do this, the edge of the braking flange may be tapered and upturned, as indicated at 4, to form a chaplet or core 4. The drum may be placed within a suitable mold and the molten invar cast about the protrusion 4 so as to form the lip or flange 5. This is shown as comprising a radially extending flange, but it will be understood that it may be of any desired configuration.

During the casting operation the molten metal will tend to fuse the adjacent section of the drum in and around the portion 4, and will therefore provide a fused zone which on solidification will present an integral structure. In addition to this integrality of structure, with its concomitant advantages, it will be observed that this method advantageously utilizes the shrinkage factor of the cast part to place the edge of the drum under a degree of compression. This not only enhances the rigidity imparted by an angularly extending flange but also acts to preserve the concentricity of the drum by applying a substantially constant, uniform radial force thereto. By this method, a line of cleavage between the two metallic sections is eliminated and in place of this there is substituted a relatively wide zone of fusion.

Figure 3:
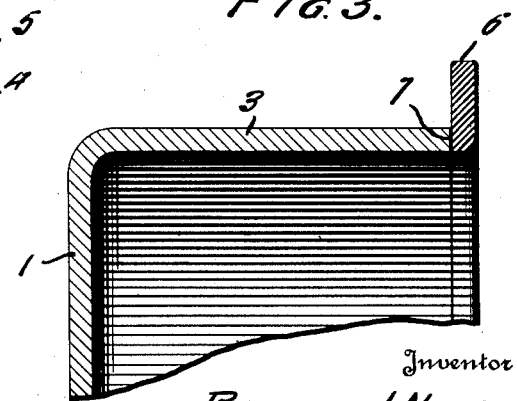
Fig. 3 is a sectional view of a modified form of the invention.

If desired, the marginal lip may be applied directly to the braking flange without making use of a casting method. An example of such a procedure is shown in Fig. 3. In this case the drum is stamped out to form the head 1 and a cylindrical flange 3. The braking flange may terminate in a squared edge to which the annulus of the differential metal 6 may be attached. This annulus may comprise a ferro-nickel of the invar range, or any other metal having the desired characteristics, and may separately be made up and then attached to the drum. In the preferred method, the annulus is connected or attached to the drum by a fusion joint indicated at 7. This may be done by seam or spot welding, brazing, soldering and the like. After such a treatment, the marginal flange 6 is, in part, at least, integrally joined to the brake drum, and if desired, a full circumferential fusion joint may be obtained; thus, as pointed out, eliminating any line of cleavage between the two metals.

After such a treatment, the brake drum in effect comprises two integral metallic sections of differential characteristics. The major portion of the brake drum being of a pressed steel having the characteristics of metals of a similar composition and the marginal lip comprising a metallic composition, or alloy having a lower coefficient of expansion and greater tensile strength. As a result of this, the marginal lip serves as a rigidifying element at the open face of the drum and also cuts down the degree of expansion which obtains in ordinary structures. Hence, when the drum and backing plate are first associated, only a very slight clearance need be allowed between them. Because of the very small gap existing between the drum and the backing plate, an effective closure is thereby presented which will exclude substantially all extraneous foreign matter.

There has been described methods which comprise forming on the drum a marginal lip of the ferro-nickel type. This material is chosen as one which is characterized by the desired properties but is given, and is to be taken, as merely indicative of a wide number of materials which may be employed. Thus, if it is desired to merely rigidify the brake drum, the flange may be so treated as to increase its tensile strength. Or again, if desired, the marginal lip which is to be attached, may be so treated or chosen so as to impart merely low thermal expansibility. The invention is considered as residing broadly in the concept or providing an integral (and by that is meant initial integral or subsequently made integral) open edge on the brake drum which is of a higher tensile strength and a lower coefficient of thermal expansion than the main portion of the brake drum.

It will be understood that the methods outlined are susceptible of a wide range of permissive variations. Thus, it has been pointed out that by casting on the flange, advantageous use is made of the shrinkage factor of the cast metal. The value of this factor may be varied by heating the braking flange to adjust the temperature differential between the two metals. Thus, if a large shrinkage factor is desired, the braking flange of the drum may be maintained at a relatively low temperature, whereas, if only a slight compressive force is sought, the temperature of the drum may be considerably raised so as to expand it, and thus, in part, neutralize or compensate for the shrinkage of the cast portion. The particular thermal conditions of the operation will, of course, depend on the physical characteristics of the metals involved.

It is to be noted in passing that no disadvantageous effects need result from the expansivity differential. While it is true that the braking flange will tend to expand more than the marginal lip and will, therefore, be stressed, this stress is distributed over a relatively wide area, and hence sufficient tolerance is provided.

It will also be appreciated that by accurately controlling the thermal conditions of the casting operation, the molten metal may be made to solidify under substantially uniform conditions throughout the circumference of the drum. In cases where alloys are used which present selective solidification phenomena, the resulting heterogeneity may be relieved by a suitable annealing step so that the pressure exerted upon the edge of the drum may be substantially uniform. In this manner, the exterior ring may be made to act on the drum with a substantially uniform radial thrust throughout its circumference and thus effectively maintain concentricity of the drum as well as checking the tendency toward a bell mouthed expansion. By thus maintaining the braking flange in substantially truly circular form, the maximum extent of effective drum braking surface is presented.

Governed by these considerations, those skilled in the art may, by utilizing the methods suggested or even by varying very widely from these, provide a brake drum which presents these new and improved characteristics and while specific structures and methods have been suggested, it is to be understood that these are to be taken as merely indicative of how the indicated improved results may be obtained; hence, the invention is considered to comprehend any comparable processes or means which may be employed to secure these improved results.

I claim:

1. A pressed steel brake drum having a marginal lip of a material of different thermal characteristics than the body of the drum.

2. A brake drum comprising a pressed steel head and flange and a marginal lip on the flange comprising a material of lower coefficient of thermal expansion than the head portion.

3. A brake drum comprising a supporting part and a braking flange, a marginal edge on the braking flange of a material of lower coefficient of expansion and higher tensile strength than the material of the flange.

4. A brake drum comprising a supporting part and a cylindrical braking flange of ferruginous material, a marginal edge on the flange comprising a ferro-nickel alloy.

5. A brake drum comprising a cylindrical braking flange and a marginal edge therefor, of a material of a higher tensile strength than and fused to the flange.

6. A brake drum comprising a cylindrical braking flange and a marginal edge therefor, of a different material having a lower coefficient of expansion.

7. A brake comprising a braking flange and a marginal edge therefor, comprising a material of a different coefficient of expansion fused to the braking flange.

8. A brake drum comprising a braking flange, a ring-like portion of a different material fused to the flange, said material having higher tensile strength than the material of the flange.

9. A brake drum comprising a braking flange, a ring-like portion of a different material fused to the flange, said material having a lower coefficient of expansion than the material of the flange.

10. A brake drum comprising a braking flange, a ring-like portion of a different material fused to the flange, said material having a lower coefficient of expansion and higher tensile strength than the material of the flange.

11. A brake drum comprising a ferruginous braking flange and a rigidifying flange of a nickeliferous metal cast thereon.

12. A brake drum comprising a steel braking flange and an integral ferro-nickel portion.

13. A brake drum comprising a steel braking flange having an invar marginal flange.

14. A brake drum comprising a braking flange of a pressed metal and an integral portion of cast metal.

15. A brake drum comprising a braking flange of pressed metal having an integral circumferential section of a metallic material of different physical characteristics fused to and adapted to rigidify the drum.

16. A brake part comprising a ferruginous member and a non-ferruginous member fused thereto.

17. A brake part comprising a ferruginous member and a nickeliferous metal cast thereon.

18. A brake part comprising a composite ferruginous and nickeliferous member.

In testimony whereof I affix my signature.

RAYMOND J. NORTON.